Figure 4:
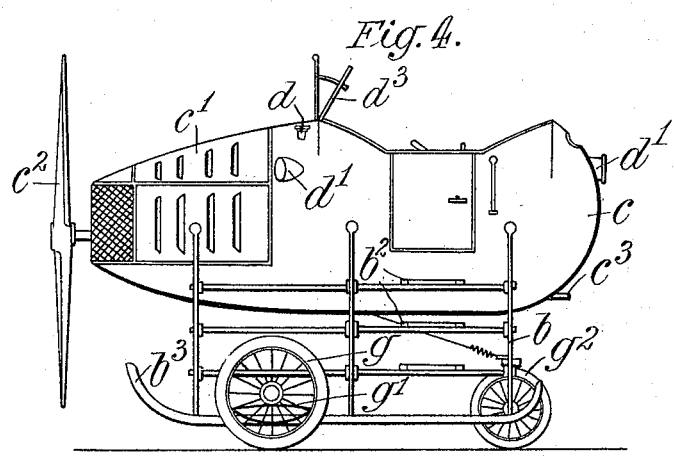

H. T. LYALL.
COMBINATION MOTOR VEHICLE.
APPLICATION FILED OCT. 26, 1914.
1,179,014.
Patented Apr. 11, 1916.
3 SHEETS—SHEET 1.
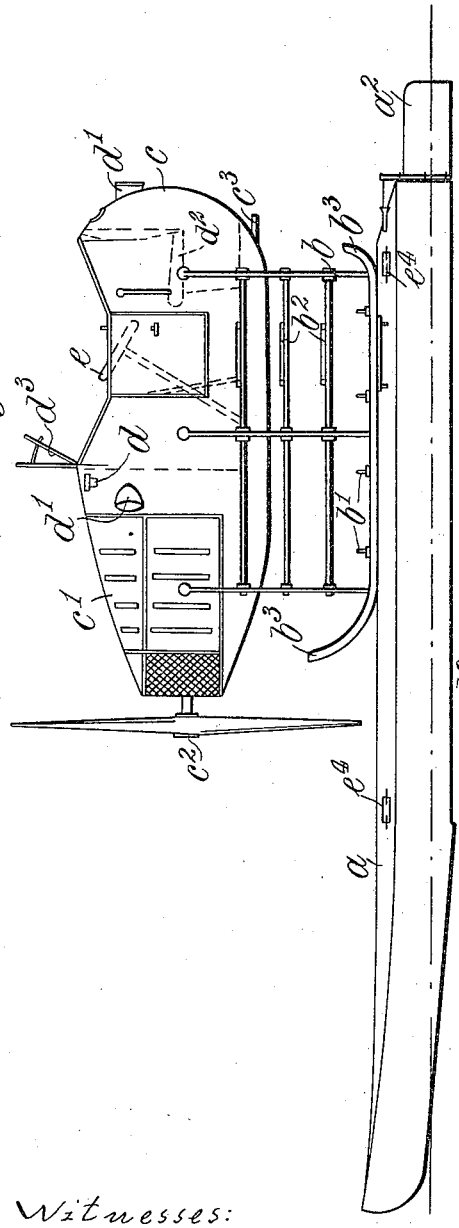
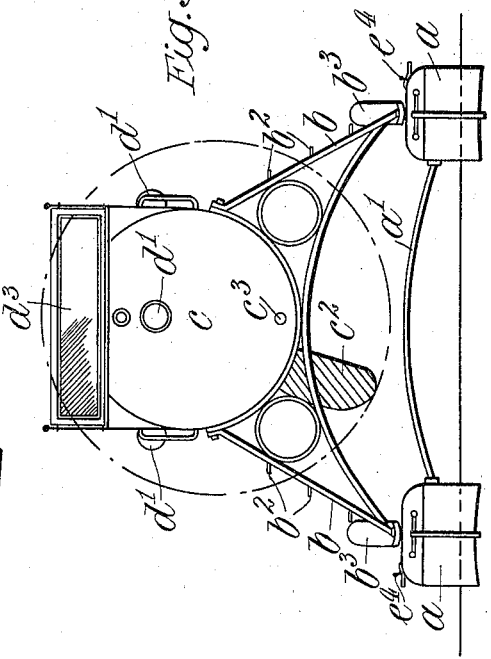
Witnesses:
E. G. McGee
W. H. Brereton
Inventor:
Horace Thomas Lyall
By Emil Bönnelyche
Attorney.

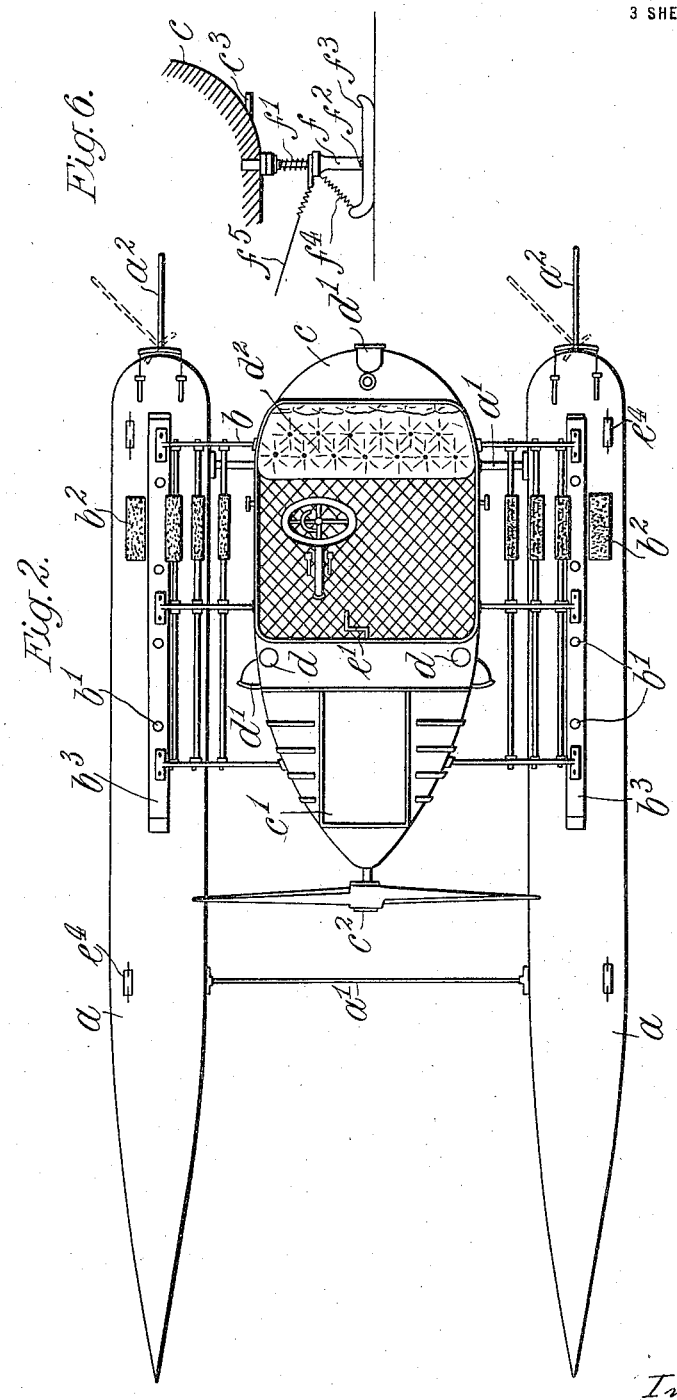

H. T. LYALL.
COMBINATION MOTOR VEHICLE.
APPLICATION FILED OCT. 26, 1914.

1,179,014.

Patented Apr. 11, 1916.
3 SHEETS—SHEET 3.

Witnesses:
E. G. McGee
W. H. Brinton

Inventor:
Horace Thomas Lyall
By Emil Boinelycke
Attorney.

UNITED STATES PATENT OFFICE.

HORACE THOMAS LYALL, OF NORWICH, ENGLAND.

COMBINATION MOTOR-VEHICLE.

1,179,014.  Specification of Letters Patent.  Patented Apr. 11, 1916.

Application filed October 26, 1914. Serial No. 868,633.

*To all whom it may concern:*

Be it known that I, HORACE THOMAS LYALL, a subject of His Majesty the King of England, residing at Norwich, in the county of Norfolk, Kingdom of England, have invented certain new and useful Improvements in Combination Motor-Vehicles, of which the following is a specification.

My invention relates to an improved mechanical power driven combination vehicle, the design and nature of the construction of which, by slight adaptation or alteration, enable it to be converted into a motor catamaran or boat, a motor sleigh and a motor-car, and make it applicable for traveling on water, snow, ice, sand and roads for the purpose of carrying passengers and merchandise, and for use for sport, pleasure, and warfare.

It has heretofore been proposed to provide a combination vehicle propelled by means of a forwardly placed turbine-like motor-driven propeller, and fitted with wheels to enable it to be used as a motor-car, with runners so that it can be used as a motor-sleigh, and with inflatable bags to enable it to be used as a motor-boat.

In carrying out my present invention I provide rigid floats, preferably two, made of steel or any other suitable metal or material and held apart and parallel in relation to one another by means of suitable stay rods, and upon these floats I place a boat-shaped body carried on a superstructure fixed on runners removably secured on said floats. In this body I place a power plant, preferably a light petrol engine such as is used in cycle cars, the power from which I employ for driving one or more air propellers or tractor screws similar in construction to those used on aeroplanes and situated at the forward portion, the sides or the stern of the body, the revolving of which propeller or propellers, tractor screw or screws would impel the combination vehicle through water, on roads, sand, ice or snow as the case may be.

When the vehicle is used on water the steering would be effected by a suitable steering wheel or the like connected up with one or more rudders mounted on the floats.

It is obvious that a power driven vessel or vehicle of the above described character would be very speedy and suitable for use on shallow waters and on rivers, lakes, estuaries and moderately calm seas. The combination vehicle could also be equipped with and adapted to receive a machine gun or guns to convert it into an instrument of warfare especially suitable for river and estuary defense work.

The vehicle may be of any size as desired if it is intended for water purposes only, that is to say as a motor catamaran or boat. When the vehicle is adaptable for traveling on water, ice, snow and land as above mentioned, by the simple process of removing the floats from the vehicle, or the body, superstructure and runners from the floats, the said runners, superstructure and body will form a component part in itself, that is to say a motor sleigh adapted to travel on ice and snow, the steering of which vehicle can be effected by pivotal shoes or runners attached to the main runners or to the superstructure, or by a separate removable central steering arm or fork, attached to the bottom of the body or where necessary, fitted with a steering shoe or runner and operated by the steering wheel or by other means. If desired the superstructure can be made in two sections, the rear portion fixed and the front portion pivotal or vice versa; the method of steering in this case would be similar to that employed on motor cars.

In converting the vehicle for traveling on sand or roads I simply attach wheels, preferably wire ones fitted with pneumatic tires, to the runners or on the superstructure as and where desired. This would raise the runners from off the ground so that the superstructure and body are supported by the wheels. Steering in this case can be effected by means of a separate removable central steering arm or fork attached to the bottom of the body, or where required, to which arm or fork is attached one steering wheel or two wheels placed close together as may be required; or the steering may again be similar to that employed on motor cars.

In order that my invention may be fully understood I will now proceed to describe same with reference to the accompanying drawings in which:—

Figure 5:
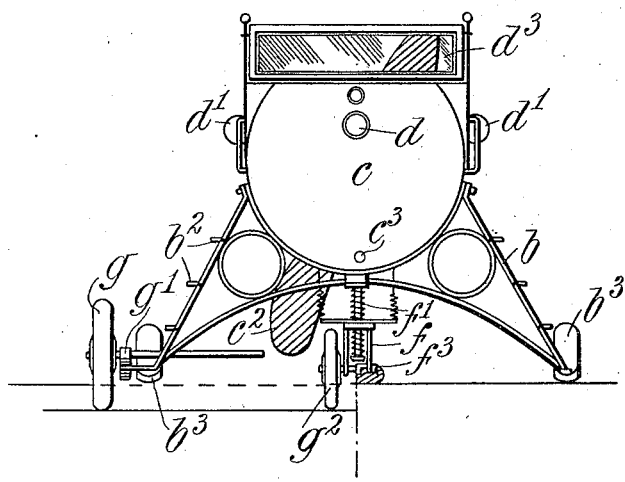

Figure 1 is a side elevation of the combination motor vehicle, showing the floats fitted thereon; Fig. 2 is a plan; and Fig. 3 a rear end elevation of same. Fig. 4 is a side elevation of the vehicle as converted for traveling on sand and roads. Fig. 5 is a rear end elevation of the body showing on the left hand side the method proposed for converting the vehicle for traveling on sand and roads, a central steering arm or fork and one of a pair of steering wheels fitted thereto. The right hand side of the figure shows the method proposed for adapting the vehicle for traveling on ice and snow by taking away the wheels and allowing the base of the superstructure, that is to say, the runners to rest on the snow or ice; showing also a central steering arm or fork and a method of steering by a shoe or runner. Fig. 6 is a side elevation of the steering shoe or runner.

Like letters of reference indicate corresponding parts throughout the several figures of the drawings.

As shown, I provide two floats $a$ made of steel or any other suitable metal or material, preferably divided into water-tight compartments, and maintained apart and parallel to one another by stay rods $a'$. I fit steering rudders $a^2$ at the stern end of the floats, or elsewhere as may be required. Upon the floats I place a superstructure $b$ preferably made of steel or any other strong metal and of such a design as may be required, and to this superstructure I attach either directly or indirectly a body $c$ of such a design as may be suitable and required by the construction of the superstructure, and free from all unnecessary protuberances, i. e. having a clean stream line formation. The whole superstructure with the body I securely and removably fasten by suitable nuts and bolts $b'$ to the floats $a$, and to the superstructure I securely attach small plates or steps $b^2$ so as to facilitate entrance to and exit from the body. The body shown in the accompanying drawings is designed for carrying two persons. Under the bonnet or hood $c'$ is placed either a water or an air cooled petrol engine to which is attached either directly or indirectly the propeller or tractor screw $c^2$ the rotation of which, as will be noticed in the drawings, is well within the extreme width of the vehicle when adapted for use as a motor catamaran or boat with the floats $a$, and within the extreme width of the vehicle when used with runners $b^3$. The exhaust from the engine escapes at the extreme stern at $c^3$. I provide petrol and lubricating oil caps $d$ leading to suitable tanks, electric or other illuminating power side and stern lights $d'$, and under the seat $d^2$ suitable lockers for tools and other articles.

As shown in Figs. 1 and 2 the steering is effected by means of a hand wheel $e$ slightly raked, to the base of the post of which wheel are attached under the floor wires for operating the rudders $a^2$, or the steering runner or wheels hereinafter described.

If desirable a wind screen $d^3$ can be fixed as shown. The engine is started by a starting handle $e'$ or by other means, the control of which will be preferably from the steering wheel $e$, and at the sides of the wheel $e$ I provide a suitable reversing gear handle and a clutch handle. To the floats $a$ suitable cleats $e^4$ can be attached for mooring purposes.

With reference to the floats $a$ it will be preferable that they are considerably longer than the superstructure $b$ and the body $c$, the reason for which is that flotation will be increased, and the resistance from water will be considerably reduced owing to the fact that the propeller $c^2$ will, according to the speed at which it is rotating, have a tendency to cause the forward portions of the floats to rise from the water.

In converting the power driven catamaran or boat above described into a motor sleigh for traveling on ice and snow I simply remove the floats $a$ from the superstructure $b$ and body $c$ and allow the runners $b^3$ to rest upon the snow or ice. The steering is preferably effected by attaching to the underside of the body $c$ a central separate removable steering arm or fork $f$, Fig. 6, fitted with a suitable spring $f'$ which spring will, to a degree, obviate shocks from uneven surfaces. At the base of the arm $f$ I attach, by means of a bolt or pivot $f^2$, a steering shoe or runner $f^3$ at the forward or front end of which I attach a tension spring $f^4$, lateral movement of the whole being effected by means of wire cables $f^5$ or other means connected with the post of the steering wheel $e$.

For converting the vehicle into a motor car for traveling on sand and roads I provide suitable wheels $g$ and springs $g'$ and attach them to the runners $b^3$ to raise the superstructure $b$ so that the latter and the body $c$ are supported by the wheels $g$. Steering in this case can be effected by means of the removable arm $f$, from which the shoe $f^3$ would be removed and one or two wheels $g^2$ attached thereto, the lateral movement of which wheel or wheels would be precisely as before described with reference to the shoe.

What I claim as my invention and desire to secure by Letters Patent of the United States is:—

1. The combination, in a motor boat, of an elevated, passenger-carrying body; a superstructure whereon said body is mounted; a pair of floats attached to the foot of said superstructure in spaced, parallel relation; an engine or motor disposed within said body; a screw propeller disposed exterior to said body at the front thereof and connected to said engine; rudders connected to the rear ends of said floats; and steering mechanism disposed within said body and connected to operate said rudders.

2. The combination, in a motor boat, of an elevated passenger-carrying body; a superstructure whereon said body is mounted; a pair of longitudinal floats arranged in spaced, parallel relation and having the foot of said superstructure affixed thereto; an engine or motor disposed within said body; a screw propeller disposed exterior to said body at the front thereof and connected to said engine, said propeller having a diameter which is less than the extreme width of the floats, and said floats having their forward portions projecting beyond said propeller; steering means disposed at the rear end of said floats; and steering mechanism disposed within said body and connected to said rudders.

In testimony whereof I have signed this specification in the presence of two subscribing witnesses.

HORACE THOMAS LYALL.

Witnesses:
Jos. Cuthers,
Frank Blaney.

Copies of this patent may be obtained for five cents each, by addressing the "Commissioner of Patents, Washington, D. C."